United States Patent
Kalkman et al.

[11] Patent Number: 5,851,046
[45] Date of Patent: Dec. 22, 1998

[54] TRACK VISOR

[75] Inventors: Jesse Kalkman; Patrick W. Binish, both of Holland, Mich.

[73] Assignee: Prince Corporation, Holland, Mich.

[21] Appl. No.: 920,586

[22] Filed: Aug. 29, 1997

[51] Int. Cl.[6] ............................................ B60J 3/02
[52] U.S. Cl. ............................ 296/97.11; 296/97.9
[58] Field of Search ..................... 296/97.4, 97.11, 296/214, 97.9; 104/95; 105/155

[56] References Cited

U.S. PATENT DOCUMENTS

| | | |
|---|---|---|
| 1,399,356 | 12/1921 | Lytle . |
| 1,795,184 | 3/1931 | Smith . |
| 1,814,500 | 7/1931 | Summerbell . |
| 1,888,703 | 11/1932 | Summerbell . |
| 1,941,032 | 12/1933 | Knowles . |
| 1,969,887 | 8/1934 | Flanary . |
| 2,477,680 | 8/1949 | Young . |
| 2,829,920 | 4/1958 | Cohen . |
| 2,932,539 | 4/1960 | Galbraith . |
| 2,978,274 | 4/1961 | Ordman . |
| 3,029,103 | 4/1962 | Horrocks . |
| 3,328,071 | 6/1967 | Johnson . |
| 3,403,937 | 10/1968 | Quaine ............................ 296/97.11 |
| 3,774,548 | 11/1973 | Borst ................................. 104/95 X |
| 3,865,428 | 2/1975 | Chester . |
| 4,921,296 | 5/1990 | Gruber . |
| 4,987,315 | 1/1991 | Abu-Shumays et al. . |
| 4,998,765 | 3/1991 | Van Order et al. . |
| 5,004,288 | 4/1991 | Viertel et al. . |
| 5,040,840 | 8/1991 | Kokeisl . |
| 5,044,687 | 9/1991 | Abu-Shumays et al. . |
| 5,056,854 | 10/1991 | Rosen . |
| 5,067,765 | 11/1991 | Frye et al. . |
| 5,158,334 | 10/1992 | Felland . |
| 5,205,604 | 4/1993 | Smith . |
| 5,211,439 | 5/1993 | Smith et al. . |
| 5,350,212 | 9/1994 | Corn . |
| 5,356,192 | 10/1994 | Schierau . |
| 5,419,260 | 5/1995 | Hamilton .......................... 104/95 X |
| 5,538,310 | 7/1996 | Frankhouse et al. . |
| 5,592,883 | 1/1997 | Andress, III ...................... 104/95 X |

FOREIGN PATENT DOCUMENTS

| | | |
|---|---|---|
| 1407244 | 6/1965 | France . |
| 2359718 | 5/1975 | Germany . |
| 3822378 | 1/1990 | Germany . |
| 446822 | 2/1992 | Japan . |
| 567958 | 3/1945 | United Kingdom . |
| 1387452 | 3/1975 | United Kingdom . |
| 2090570 | 1/1982 | United Kingdom . |

*Primary Examiner*—Joseph D. Pape
*Attorney, Agent, or Firm*—Price, Heneveld, Cooper, DeWitt & Litton

[57] ABSTRACT

A track visor includes a visor body with a rolling guide assembly engaged with a track extending above at least a portion of the front windshield and side window of a vehicle. The track is a curved, non-planar configuration with a pair of outer-extending rails which are parallel to each other along straight sections of the track and increase in separation distance with increased curvature of the track. The guide assembly has three rolling wheels assembled to a carriage, with two of the wheels engaged to one rail and the third wheel engaged to the opposite rail. The third wheel is assembled to a pivot arm that is spring biased for compressing the wheels against the rails of the track. The visor body is pivotally connected to the carriage and, therefore, movable above selected positions of the windshield and side door window for providing incident light blocking.

20 Claims, 7 Drawing Sheets

TRACK VISOR

BACKGROUND OF THE INVENTION

The present invention generally relates to a movable visor and, more particularly, to a track visor that can be moved to selected locations for blocking incident sunlight.

There exists a number of sliding visors mounted to a vehicle for movement along the windshield and side windows of the vehicle. One example of a sliding visor is disclosed in U.S. Pat. No. 3,403,937. In the past, sliding visors of the aforementioned type have utilized relatively large panels and typically employed tracks with the visor slidingly engaged thereon. Such visors replace the conventional visors which were pivotally mounted to swing between the front windshield position and the side window position.

More recently, a sliding visor has been proposed with a slide engaged within a track extending along the upper edge of the door frame and downwardly into the A-pillar of the vehicle, as disclosed in U.S. Pat. No. 5,538,310, which is hereby incorporated by reference. Also disclosed in the aforementioned issued patent is a windshield mounted track visor which includes a track concealably mounted behind the vehicle headliner above the windshield and extending from the A-pillar above the front windshield area to an approximate center line of the vehicle. The above-identified visor has a visor body coupled T-shaped slide that is slidably engaged within a generally rectangular opening of the track.

Although there exists a variety of such sliding track visors, there remains a need for providing a compact versatile visor which can be conveniently moved to pinpoint incident light and be readily adjustable to continue performing a sun-blocking protection with changes in the vehicle orientation with respect to the incident light.

SUMMARY OF THE INVENTION

Accordingly, it is therefore an aspect of the present invention to provide a track visor that may be easily moved to various locations above the side door window and front windshield of the vehicle. It is a further aspect of the present invention to provide such a track visor that easily moves along a track having both straight and curved sections and smoothly transitions between the straight and curved sections. Yet, it is also an aspect of the present invention to provide for a track visor with a guide mechanism that may accommodate various track curvatures, including a non-planar track.

To achieve these and other aspects and advantages, the track visor of the present invention includes a track concealably mounted behind the vehicle headliner and extending above both the front windshield and the side window. The track has a curved, non-planar configuration and has outer-extending rails for rollingly engaging wheels of a guide mechanism. The outer-extending rails are parallel to each other along straight sections of the track and increase in separation distance with increased curvature of the track. The guide assembly includes three rotatable wheels assembled to a carriage, with two of the wheels engaging one rail and the third wheel engaging the opposite rail. The wheels each have a V-groove configuration for matingly engaging the corresponding rails on the track. At least one of the wheels is spring biased such that the wheels compressively engage the rails of the track. A visor body, which may include an illuminated vanity mirror, is pivotally connected to the carriage and is, therefore, movable above selected positions of the windshield and side door window for providing incident light blocking as desired to provide a compact and effective, easily used visor system.

These and other features, objects, and advantages of the present invention will become apparent upon reading the following description thereof, together with reference to the accompanying drawings.

DETAILED DESCRIPTION OF THE PREFERRED EMBODIMENT

Figure 1:
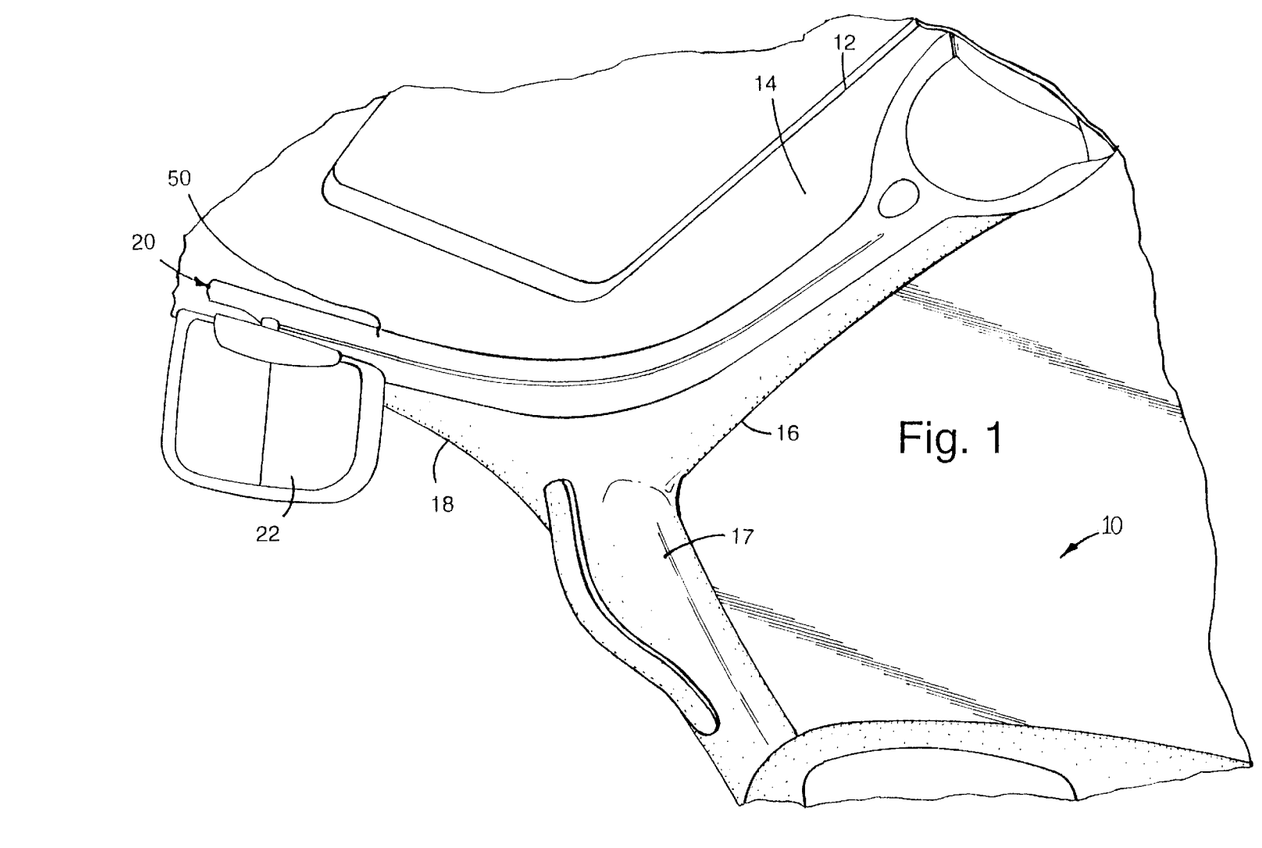
FIG. 1 is a fragmentary, perspective view of a vehicle showing a track visor of the present invention.

Turning now to FIG. 1, a vehicle 10 is shown having a track visor assembly 20 according to the present invention. Vehicle 10 includes a roof structure 12 covered by a pre-formed molded headliner assembly 14 and positioned above the vehicle glass, including front windshield 16 and side door window 18. The track visor assembly 20 includes a visor body 22 connected to a rolling guide mechanism that guides the visor body 22 along a track 50 extending above both the front windshield 16 and side door window 18 and including a curved intermediate section above the vehicle's A-pillar 17.

Figure 2:
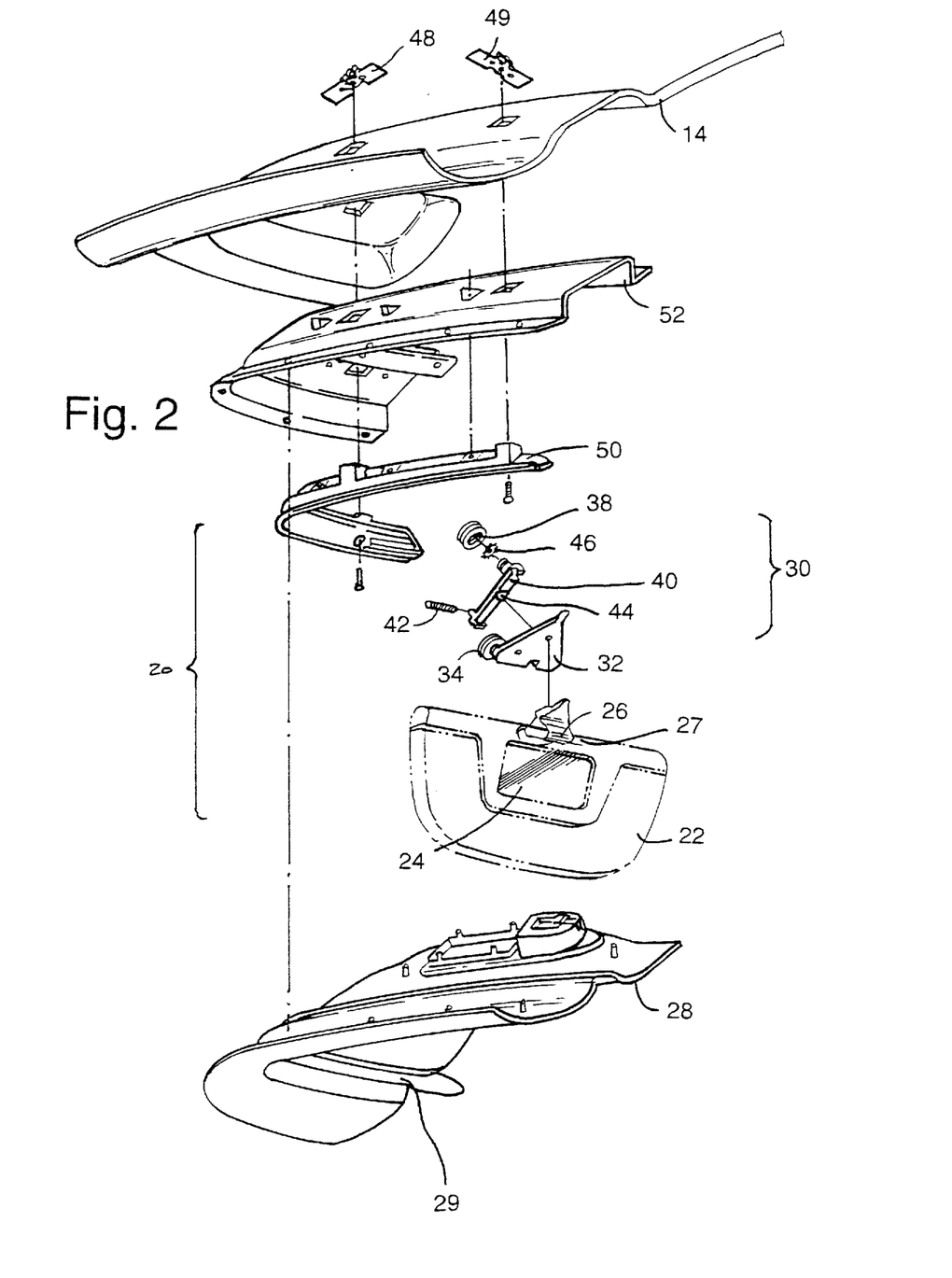
FIG. 2 is an exploded, fragmentary perspective view of the vehicle headliner and track visor of the present invention.

As shown in FIG. 2, the track visor assembly 20 has a polymeric molded track 50 fastened to roof structure 12 via clips, including clips 48 and 49. Disposed between the track 50 and roof structure 12 is a support plate 52 and headliner assembly 14. Track visor assembly 20 has a rolling guide assembly 30 with polymeric wheels 34, 36, and 38 in a generally triangular arrangement, each having a V-shaped groove provided about the outer circumference for engaging a pair of rails on the track 50. The visor body 22 is pivotally connected to rolling guide assembly 30 via a connecting arm 26 and pivot rod 27, and is shown having a vanity mirror 24 provided on one side thereof. An interior trim assembly 28 substantially covers the track 50 and guide assembly 30 and has a channel 29 through which the connecting arm 26 and visor body 22 extend into the interior of the vehicle 10. Guide assembly 30 includes a carriage 32 which has the first and second wheels 34 and 36 directly attached thereto. The third wheel 38 is attached to pivot arm 40 which, in turn, is pivotally connected to carriage 32 via pivot point 44 and is further biased via pivot arm spring 42.

Figure 3:
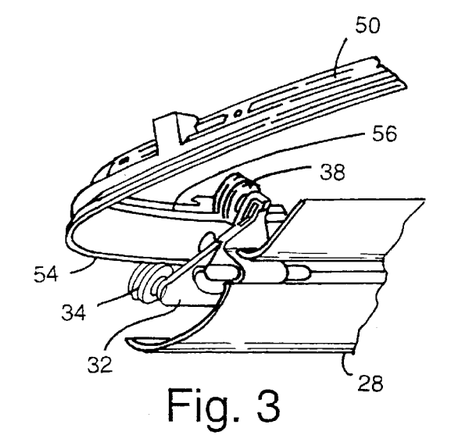
FIG. 3 is an enlarged, fragmentary perspective view of a portion of the track visor.
Figure 4:
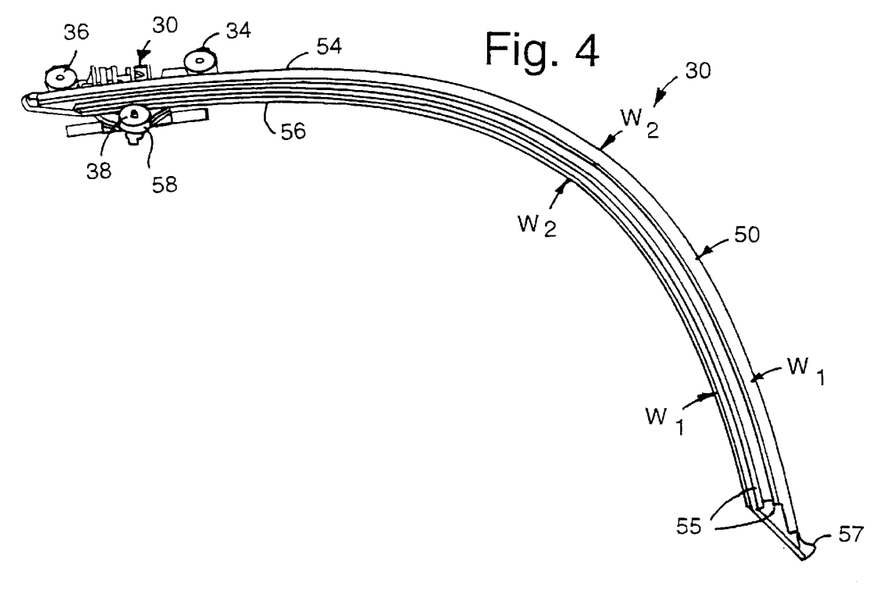
FIG. 4 is a perspective view of a rolling guide mechanism engaging a track of the track visor of the present invention.

Referring to FIGS. 3 and 4, the track 50 has a pair of outer-extending rails 54 and 56 on opposite sides of the track with V-shaped edges which matingly engage the V-shaped grooves of wheels 34, 36, and 38. Track 50 preferably extends above both a portion of side door window 18 and a portion of front windshield 16 with a curved, non-planar configuration, generally defined by the contour of the roof structure and headliner assembly of the vehicle. The track 50 may include a one-piece construction of an injection molded polymeric material having a pair of ribs 55 provided on one face for added structural integrity. An arm 57 extends from one end of track 50 to define a stop position for guide assembly 30. In order to maintain a constant effective width between the pair of wheels 34 and 36 on rail 54 and wheel 38 on rail 56 as they maneuver around the curved section, track 50 is designed with a varying cross section such that the opposing rails 54 and 56 have a separation distance which varies with the radius of the curvature of the curved section so as to prevent varying slide efforts due to deflection of the pivot arm spring 42. As shown in FIG. 4, track 50 has a width $W_1$-$W_1$ taken across a straight section and a greater Width $W_2$-$W_2$ taken across a curved section. Generally, the greater the curvature, e.g., the smaller the radius of curvature, the greater the increase in width of track 50 at the curved section.

Figures 5, 6:
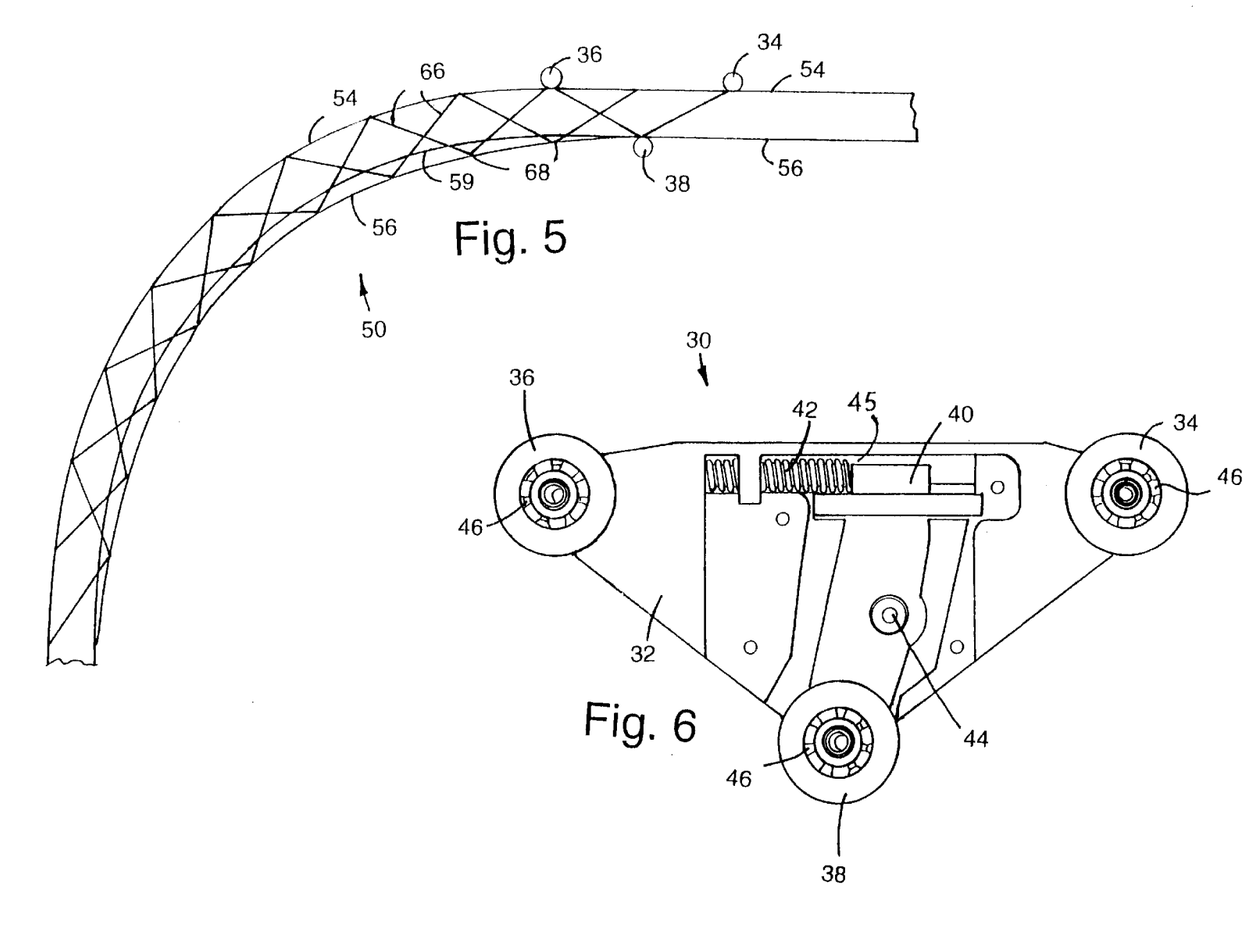
FIG. 5 is a schematic diagram further illustrating the track profile for a curved section of track.
FIG. 6 is an enlarged, top plan view of the rolling guide mechanism shown in FIG. 4.

The profile of track 50 is further illustrated in FIG. 5, which provides one example of a best fit rail separation distance for a curved section of track 50 to accommodate changes in the effective width between wheels 34, 36, and 38. Wheels 34, 36, and 38 are shown on a straight section of track 50, compressively engaging rails 54 and 56. As wheels 34, 36, and 38 transition from the straight section to the curved section of track 50, the effective width between the pair of wheels 34 and 36 and wheel 38 would otherwise decrease with an increase in track curvature if the track width were to remain constant, as illustrated by line 59 which is in parallel with rail 54. To illustrate the best line fit for developing a widened track width for the curved section, lines 66 represent the approximate fit of wheels 34, 36, and 38 that is necessary to maintain a substantially constant distance between wheel 38 and the pair of wheels 34 and 36 as they roll along rails 54 and 56. Accordingly, the extended points 68 represent the corrected profile of track 50 and define the width necessary between rails 54 and 56 in the present example. This allows for a constant effective width between the outside wheels 34 and 36 and the inside wheel 38 as they maneuver around the curved section of the track 50. Maintaining a constant distance between the wheels prevents varying slide efforts due to deflection of spring 42, and thereby allows for a smooth transition between the straight portions and the curved portion of the track 50.

With particular reference to FIG. 6, the guide assembly 30 is further illustrated in greater detail. First and second wheels 34 and 36 are assembled onto carriage 32 in a generally fixed relationship and are aligned so as to commonly engage rail 54 of track 50. The third wheel 38 is assembled onto pivot arm 40 and adjustably aligned so as to engage the opposite rail 56 of track 50. Spring 42 is compressed within recess 45 and biases pivot arm 40 which pivotally moves about pivot point 44. Spring biased pivot arm 40, therefore, allows wheel 38 to pivot about pivot point 44. This allows wheel 38 to move relative to wheels 34 and 36 to vary the effective distance therebetween and further allows for a compressive fitting of the wheels 34, 36, and 38 onto track 50.

As further shown, each of wheels 34, 36, and 38 is assembled with ball bearings 46 to decrease rotational resistance and enhance the rotation thereof. In addition, wheels 34 and 36 are preferably slightly angled relative to carriage 32 to compensate at least partially for the non-planar characteristics of track 50. Along straight sections of track 50, the planar carriage 32 is parallel to the plane of the track. However, along curved sections, a non-planar track configuration results in the rails 54 and 56 being positioned at an angle relative to the plane of the carriage 32. Accordingly, by positioning the wheels 34 and 36 at a slight angle, a compromising medium can be achieved between straight and curved sections. Also, a pivoting wheel could be employed such that wheels 34 and 36 pivot to align with the rail to compensate for any misalignment.

The rolling guide assembly 30 of the present invention enables the visor body to traverse on and between straight track sections and curved track sections and has the capability to move along curved sections of various tracks having varying radii of curvature, with a smooth transition. Accordingly, guide assembly 30 offers flexibility in accommodating tracks with various radii of curvature and, therefore, can be used on different vehicles having tracks of various configurations. By placing the load of the wheels 34, 36, and 38 in a compressive mode, deformation of the polymeric track due to creep can be eliminated. The compressed wheel assembly also allows for proper load to be applied to the wheels to prevent them from becoming dislodged from the track during normal and excessive use of the visor.

Figure 7:
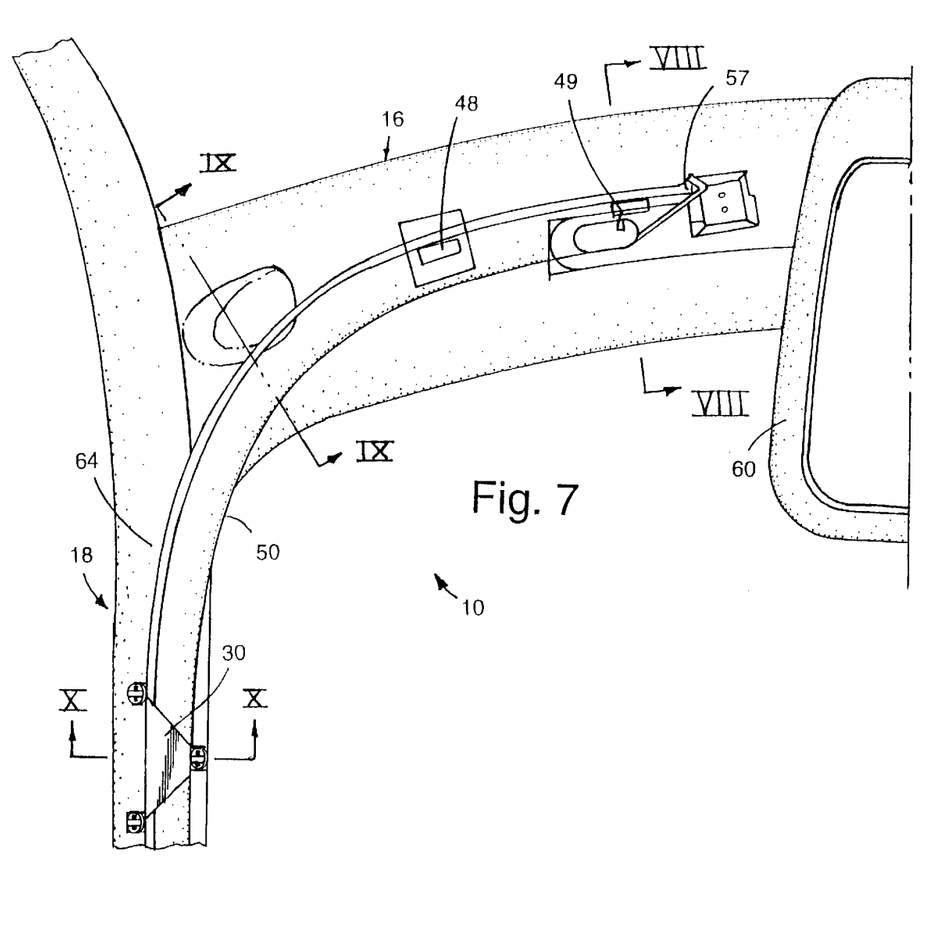
FIG. 7 is a fragmentary, top plan schematic view looking through a portion of the vehicle showing the track visor assembled to the vehicle.

With particular reference to FIG. 7, the track 50 and rolling guide assembly 30 are further shown assembled to the vehicle 10 as seen from a top view. Track 50 extends from a location above the side window 18 and wraps around a portion of the front windshield 16 toward the overhead console 60, located near a centerline of the vehicle 10. Alternately, track 50 could further curve away from the window so as to allow the visor body to block incident light from another side of the vehicle. Above the side window 18, track 50 has a substantially straight section and is connected to the side rail 64 which, in turn, is welded to the roof. Above the front window, track 50 also has a substantially straight section and is connected to the header which is likewise welded to the roof. The intermediate section of track 50 is curved and extends above the A-pillar. To accommodate the contour of the roof structure and location of the visor, track 50 is generally formed in a curved, non-planar configuration. While the track visor is shown assembled on one side of vehicle 10, it should be appreciated that the principles of the present invention are likewise applicable to the track visor located on the other side of the vehicle 10.

Figures 8, 9:
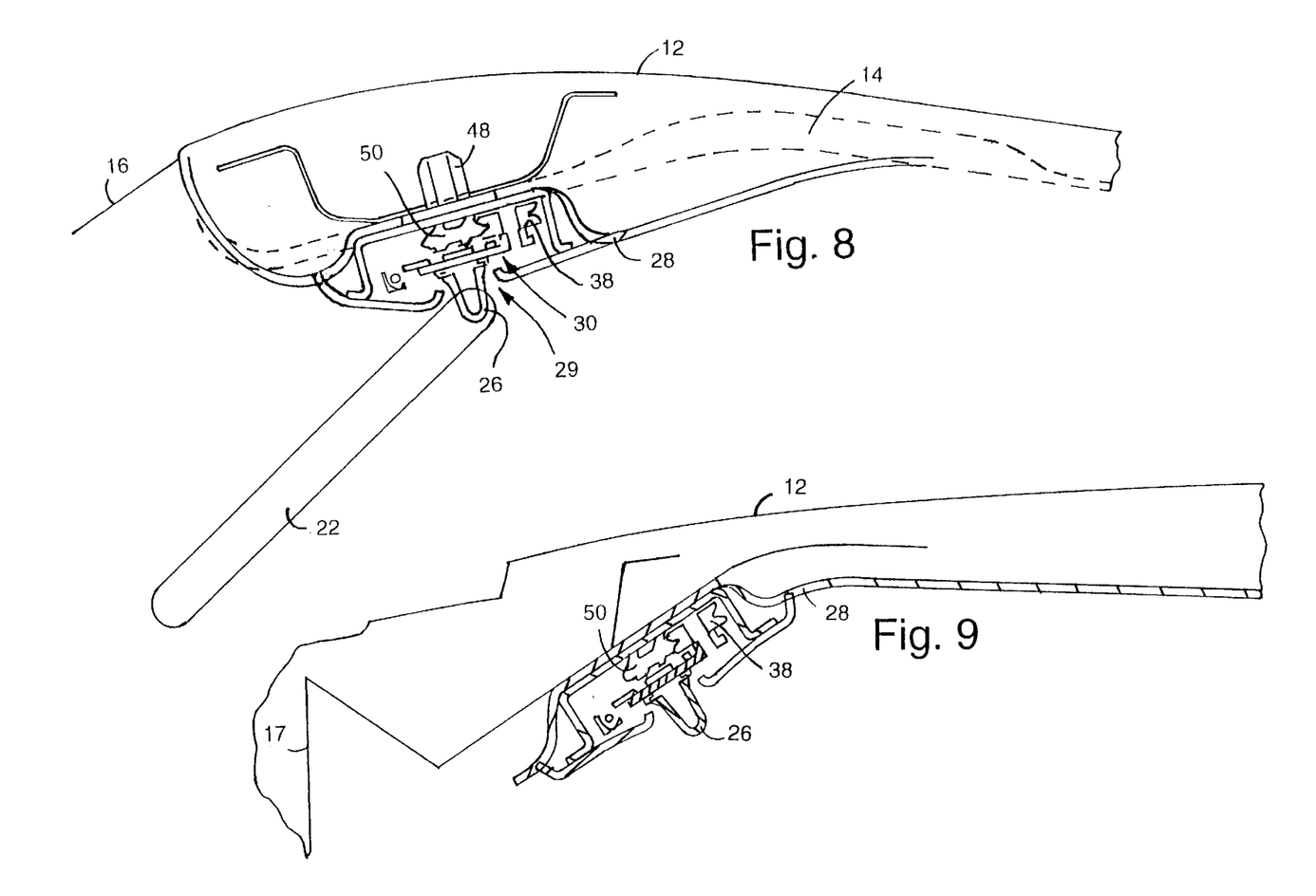
FIG. 8 is an enlarged, fragmentary, cross-sectional view taken along Section Lines VIII—VIII of FIG. 7.
FIG. 9 is an enlarged, fragmentary, cross-sectional view taken along Section Lines IX—IX of FIG. 7.

As seen in FIG. 8, the track 50 is mounted to roof structure 12 via clip 48 just above the front windshield 16. Wheels 34, 36, and 38 of rolling guide assembly 30 compressibly engage opposite rails of track 50 and easily roll along track 50 with little effort. Interior trim 28 substantially covers visor assembly 20 and track 50, with the exception of allowing the extending post 26, with visor body 22 connected thereto, to extend through channel 29 provided in interior trim 28. Extending post 26 is pivotally mounted to the visor body 22 to allow the visor body to pivot between the upper stored position and various lowered use positions.

The visor assembly 20 is easily movable as the wheels roll along the axis of curvature of the track 50 to allow a smooth transition from a straight section to the curved section as shown near the A-pillar 17 of the vehicle 10 in FIG. 9. While transitioning from the straight section above windshield 16 to the curved section located in a region above the A-pillar 17, wheels 34, 36, and 38 roll along outer-extending rails 54 and 56 of track 50 and maintain a substantially uniform distance between the pair of wheels 34 and 36 and wheel 38, due to the increased width of track 50. At all times, wheel 38 is spring biased to maintain the wheels 34, 36, and 38 in a compressed state against rail 54 and 56.

Figure 10:
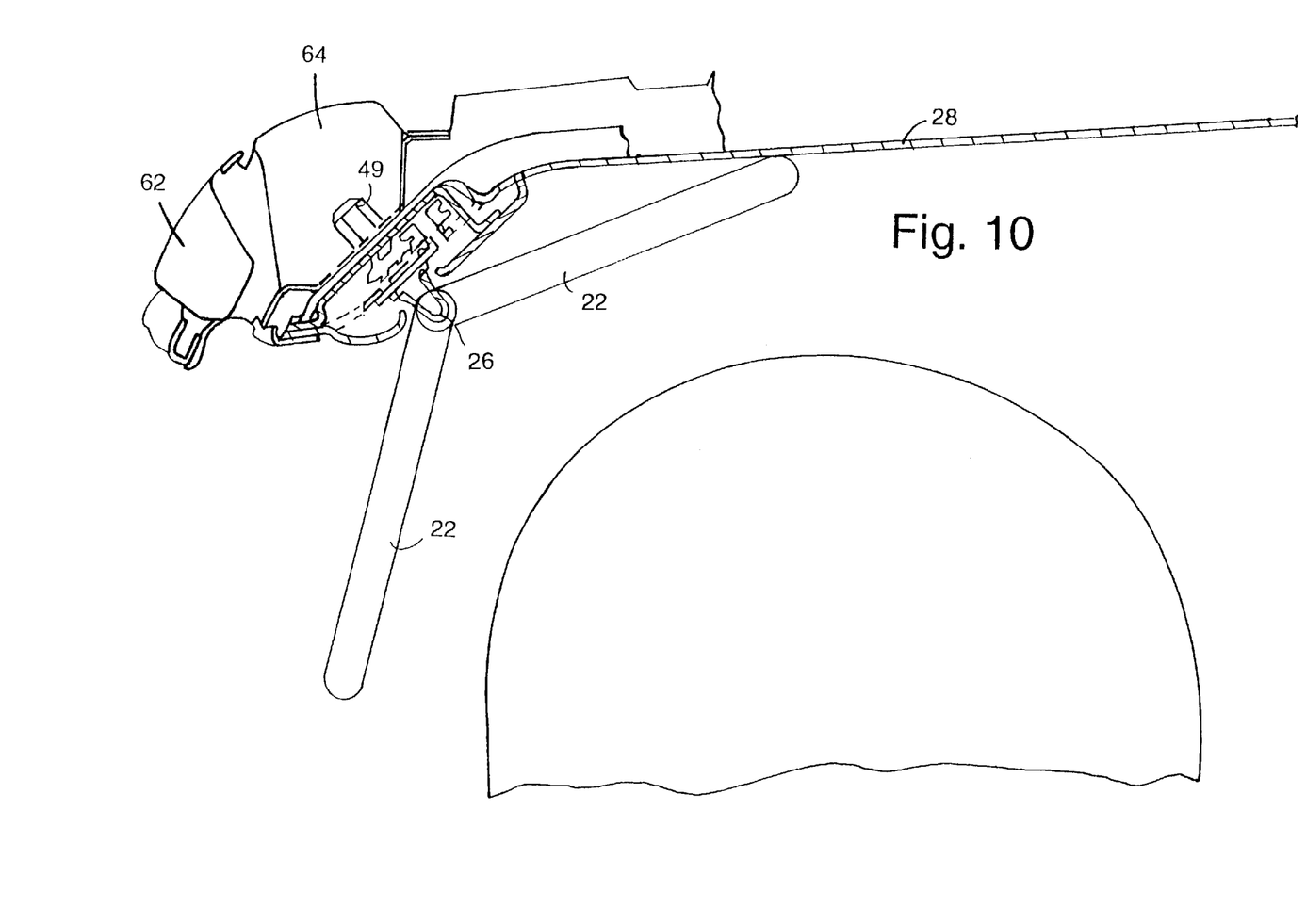
FIG. 10 is an enlarged, fragmentary, cross-sectional view taken along Section Lines X—X of FIG. 7.

The visor assembly 20 can likewise transition with ease from the curved section of track 50 to the straight section located above side window 18, as shown in FIG. 10. In this view, track 50 is shown mounted to the side rail 64 via clip 49 adjacent to the side door 62 of the vehicle. Track 50 has a substantially straight section along a portion above side window 16. Visor body 22 is also shown in both the upper stored position and a lowered use position.

The size of the visor assembly 20, and particularly the visor body 22, can be significantly smaller than that of a conventional visor as visor assembly 20 can be moved with ease from the center of the windshield area toward the A-pillar 17 and along a side of the vehicle above the side door to pinpoint and block out high intensity incident light. Track 50 can include a detent position for engaging the visor in a desired home position, such as a location for convenient storing. Also, the visor so defined can further provide the function of a convenient vanity mirror assembly as well as being pivotable to allow the visor to pivot between a raised, stored position and selected lower use positions. For such purpose, the diameter of the pivot rod and socket are preferably selected to provide the desired rotational torque for holding the visor in a selected, adjusted use position.

In addition, the design of the track and wheels as well as the proper spring force biasing wheel 38, enable the guide assembly 30 to remain engaged with the track 50 when subjected to normal pull-down forces. However, it should be appreciated that the guide assembly 30 may be released and detached from track 50 when subjected to excessive force caused by a vehicle impact. Further, the embodiment of a polymeric track 50 in the vehicle as defined herein, as well as assembly with the guide assembly 30 having V-groove wheels, may advantageously add to the impact energy absorption. As a consequence of the enhanced energy absorption gained from use of the track visor as defined herein, impact energy absorption requirements may be more easily met. As an option, energy absorbing ribs can be added along the length of the track to accommodate different stiffness values as desired in different areas.

The visor assembly 20 of the present invention enables the guide assembly 30 and visor body 22 to easily transition between straight and curved sections of varying radius with a smooth transition. This is accomplished with minimal packaging space, while providing high stability. It should be appreciated that the track 50 can be provided in a variety of configurations, preferably so as to conform to the structural design of the vehicle. The rolling guide assembly 30 may be employed with various different track configurations having varying radii of curvature.

Thus, according to the present invention, a track visor system is employed in which a visor body connected to a rolling guide assembly is movable along a track extending above both the front windshield and a side window of a vehicle. The resultant visor construction provides the desired sun-blocking of incident light and yet provides a relatively compact visor system which is particularly suitable for relatively modern vehicle designs in which space is at a premium.

It will become apparent to those skilled in the art that various modifications to the preferred embodiment of the present invention can be made without departing from the spirit and scope thereof as defined by the appended claims.

The embodiments of the invention in which an exclusive property or privilege is claimed are defined as follows:

1. A track visor for a vehicle comprising:
   a track for mounting to a vehicle roof and extending above a portion of a windshield and a side window of the vehicle, said track including a curved, non-planar section and first and second engaging surfaces;
   a visor body; and
   a guide assembly coupled to the visor body and having at least one wheel for rollingly engaging said first engaging surface and another wheel for rollingly engaging said second engaging surface, wherein said guide assembly is movable along the track to position the visor body at selected locations.

2. The track visor as defined in claim 1, wherein said first and second engaging surfaces comprise first and second rails, respectively.

3. The visor track as defined in claim 1, further comprising a connector for pivotally coupling said visor body to said guide assembly.

4. The track visor as defined in claim 1, wherein said track and guide assembly are substantially covered by a headliner.

5. The track visor as defined in claim 1, wherein said track is integrally molded of a polymeric material.

6. A track visor for a vehicle comprising:
   a track for mounting to a vehicle roof and extending above a portion of a windshield and a side window of the vehicle, said track including a curved, non-planar section and first and second engaging surfaces;
   a visor body; and
   a guide assembly coupled to the visor body and having at least one wheel for rollingly engaging said first engaging surface and another wheel for rollingly engaging said second engaging surface, wherein said guide assembly is movable along the track to position the visor body at selected locations,
   wherein said first and second engaging surfaces comprise first and second rails, respectively, and said track has a separation distance between the first and second rails which varies as a function of the radius of curvature of the track.

7. A track visor for a vehicle comprising:
   a track for mounting to a vehicle roof and extending above a portion of a windshield and a side window of the vehicle, said track including a curved, non-planar section and first and second engaging surfaces;
   a visor body; and
   a guide assembly coupled to the visor body and having at least one wheel for rollingly engaging said first engaging surface and another wheel for rollingly engaging said second engaging surface, wherein said guide assembly is movable along the track to position the visor body at selected locations, wherein said guide assembly further comprises a spring bias for biasing said another wheel relative to said at least one wheel to allow said another wheel to move relative to said at least one wheel to compress said track between said wheels.

8. A track visor for a vehicle comprising:
   a track for mounting to a vehicle roof and extending above a portion of a windshield and a side window of the vehicle, said track including a curved, non-planar section and first and second engaging surfaces;
   a visor body; and
   a guide assembly coupled to the visor body and having at least one wheel for rollingly engaging said first engaging surface and another wheel for rollingly engaging said second engaging surface, wherein said guide assembly is movable along the track to position the visor body at selected locations, wherein said guide assembly further comprises a carriage, a pivoting arm, and a bias spring, and first and second wheels rotatably mounted to the carriage and said another wheel is coupled to the pivoting arm at one end with said bias spring biasing said another wheel toward said first and second wheels.

9. A track visor for a vehicle, comprising:

a track for mounting to a vehicle to extend above at least a portion of the windshield and a side window, said track including first and second opposed rails and having a curved section between opposite ends of said track;

a visor body; and a guide assembly coupled to the visor body and having a carriage, first and second wheels connected to said carriage for rollingly engaging said first rail and a third wheel for rollingly engaging the second rail, said guide assembly further including a pivot arm coupled to the third wheel at one end and a spring biasing the pivot arm at a second end for allowing said third wheel to move relative to said first and second wheels and to provide a compressive force on the first and second rails of the track.

10. The track visor as defined in claim 9, wherein said track has a separation distance between the first and second rails which varies as a function of the radius of curvature of said track.

11. The visor track as defined in claim 9, further comprising a connector for pivotally coupling said visor body to the guide assembly.

12. The visor track as defined in claim 9, wherein said track includes a curved, non-planar section.

13. A rolling guide assembly for moving a visor body to selected positions along a track in a vehicle, said guide assembly comprising:

a carriage carrying a visor body;

first and second wheels attached to said carriage and adapted to rollingly engage a first rail of a track in a vehicle;

a third wheel adjustably coupled to said carriage to rollingly engage a second rail of said track, said third wheel being biased toward said first and second wheels so as to provide compressive engagement to the track.

14. The guide assembly as defined in claim 13, further comprising:

a pivot arm coupling said third wheel to said carriage; and a spring for biasing said pivot arm so a to bias said third wheel toward said first and second wheels.

15. A track visor for a vehicle comprising:

a track for mounting to a vehicle roof and extending above a portion of a windshield of the vehicle, said track including first and second engaging surfaces;

a visor body; and a guide assembly coupled to the visor body and movable along the track to position the visor body at selected locations, said guide assembly having at least one wheel for rollingly engaging said first engaging surface and another wheel for rollingly engaging said second engaging surface, and wherein said guide assembly further includes a spring bias for biasing said another wheel relative to said at least one wheel to allow said another wheel to move relative to said at least one wheel to compress said wheels against said first and second engaging surfaces of said track.

16. The track visor as defined in claim 15, wherein said track has a separation distance between said first and second engaging surfaces which varies as a function of radius of curvature of the track.

17. A track visor for a vehicle comprising:

a track for mounting to a vehicle roof and extending above a portion of a windshield of the vehicle, said track including first and second engaging surfaces;

a visor body; and a guide assembly coupled to the visor body and movable along the track to position the visor body at selected locations, said guide assembly having at least a first wheel for rollingly engaging said first engaging surface and a second wheel for rollingly engaging said second engaging surface.

18. The track visor as defined in claim 17, wherein said guide assembly further comprises a spring bias for biasing said second wheel relative to said at least a first wheel to allow said second wheel to move relative to said at least a first wheel to compress said wheels against said first and second engaging surfaces.

19. The track visor as defined in claim 17, wherein said guide assembly further comprises a carriage, a pivoting arm, and a bias spring, and said at least a first wheel includes a pair of wheels mounted to the carriage and said second wheel is coupled to the pivoting arm at one end with said bias spring biasing said second wheel toward said pair of wheels.

20. The track visor as defined in claim 1, wherein said at least one wheel continuously engages said first engaging surface only and said another wheel continuously engages said second engaging surface only as said guide assembly is movable along the track to position the visor body at selected locations.

* * * * *

UNITED STATES PATENT AND TRADEMARK OFFICE
CERTIFICATE OF CORRECTION

PATENT NO. : 5,851,046
DATED : December 22, 1998
INVENTOR(S) : Jesse Kalkman et al.

It is certified that error appears in the above-identified patent and that said Letters Patent is hereby corrected as shown below:

Column 3, line 22;
    "Width" should be --width--.

Column 7, line 52;
    "so a to" should be --so as to--.

Signed and Sealed this

Eighteenth Day of May, 1999

*Attest:*

Q. TODD DICKINSON

*Attesting Officer*      Acting Commissioner of Patents and Trademarks